2,947,782
AMINOACETAMIDOXIMES

Peter L. de Benneville and Charles S. Hollander, Philadelphia, Pa., assignors to Rohm & Haas Company, Philadelphia, Pa., a corporation of Delaware No Drawing. Filed Dec. 23, 1957, Ser. No. 704,331

11 Claims. (Cl. 260—551)

This invention deals with specific substituted aminoacetamidoximes as new compositions of matter. It further deals with a method for the preparation of the specific substituted aminoacetamidoximes.

The compounds of this invention may be represented by the formula

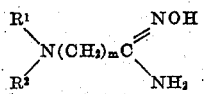

in which $R^1$ may be a hydrogen atom or an alkyl group of no more than two carbon atoms, that is methyl or ethyl and $R^2$ is an alkyl group containing from 1 to 18 carbon atoms. The $R^2$ group represents alkyl in all of the known structural configurations such as normal, iso, tertiary, and the like. $R^2$ also contemplates cycloalkyl and alkyl substituted cycloalkyl groups and such is the construction to be put upon it. If $R^1$ and $R^2$ are each alkyl groups, then neither may contain more than two carbon atoms. However, if $R^1$ represents hydrogen, then $R^2$ may be an alkyl group of one to 18 carbon atoms. Also $R^1$ and $R^2$ may be considered collectively to represent a divalent saturated chain that forms with the amino nitrogen atom, a heteromonocyclicamine group such as pyrrolidine, piperidine, morpholine and thiamorpholine rings, and their C-alkylated derivatives. Furthermore, $R^2$ may also be a phenyl group, particularly when $R^1$ represents a hydrogen atom or a methyl group.

Illustrative representations of $R^2$ include methyl, ethyl, isopropyl, tert-butyl, hexyl, tert-octyl, isodecyl, dodecyl, tert-dodecyl, tetradecyl, hexadecyl, octadecyl, and phenyl. The symbol $m$ represents an integer of one to two, preferably one.

The present compounds are prepared by reacting in substantially equal molecular proportions a hydroxylamine salt with a specific substituted aminoacetonitrile having the formula $R^1R^2N(CH_2)_mCN$ in which the symbols have the significance previously discussed. While any of the common hydroxylamine salts may be employed, it is preferred to use the hydrochloride, the hydrobromide or sulfate or the like. While it is possible to use free hydroxylamine in this reaction, it is highly preferred to employ the salt form as previously stated since the reaction is more readily consummated and the salt form of hydroxylamine is more commonly and economically available.

The reaction is effected in good yields approaching quantitativeness without the necessity of or desire for a catalyst. Temperatures of about 0° to 80° C. are conveniently employed. It is desirable to employ an inert volatile solvent such as water or a lower alkanol such as methanol, ethanol, propanol, butanol, or convenient mixtures thereof since better contact between the reactants is thereby achieved. The reaction is exothermic in nature and one skilled in the art is able to accurately follow the course of the reaction by observing the heat evolved. After the heat of reaction has dissipated, there is added an equivalent of base in order to free the product from its acid salt. In this respect, any common basic agent may be employed such as sodium carbonate, potassium carbonate, and the like. In many cases, the free aminoacetamidoxime precipitates at this point as a crystalline solid. In some cases it remains in solution, and in order to isolate the product, one then removes the solvent by stripping, preferably under reduced pressure, or if an alcohol is employed, salt formed from the equivalent of the acid salt of the hydroxylamine is filtered off first and then the alcohol is removed by stripping, preferably at reduced pressure. The products are crystalline in nature and they may be recrystallized from suitable solvents such as lower alkanols or mixtures thereof.

Typical reactants that may be employed in addition to the hydroxylamine acid salts include dimethylaminoacetonitrile, cyclohexylaminoacetonitrile, t-octylaminoacetonitrile, octadecylaminoacetonitrile, butylaminoacetonitrile, propylaminoacetonitrile, hexadecylaminoacetonitrile, dodecylaminoacetonitrile, tetradecylaminoacetonitrile, methylaminoacetonitrile, N-cyanomethylpiperidine, N-cyanomethylpyrrolidine, N-cyanomethylmorpholine, octylaminopropionitrile, diethylaminoacetonitrile, N-phenyl-glycinonitrile and N-phenyl-N-methylaminoacetonitrile.

The compounds of this invention are effective sequestering agents particularly with respect to iron. These compounds are, also, active fungicides particularly against *Stemphylium sarcinaeforme* and *Monilinia fructicola* wherein up to 100% control is observed with concentrations of about 0.1% as evaluated according to standard test procedures. At the same time, these compounds exhibit no appreciable phytotoxicity even in concentrations up to 1%.

The compounds of this invention, as well as the method for the preparation, may be more fully understood from the following examples which are offered by way of illustration and not by way of limitation. Parts by weight are used throughout.

Example 1

There are added to the reaction vessel 42 parts of dimethylaminoacetonitrile and 100 parts of ethanol. There is then added over a 10 minute period, 35 parts of hydroxylamine hydrochloride dissolved in 35 parts of water. An exothermic heat of reaction results. When heat is no longer evolved, 26.5 parts of solid sodium carbonate is added. The reaction mixture is stirred and the salt formed is filtered off. The ethanol is removed in vacuo and the product is recrystallized from isopropyl alcohol. The product contains 41.5% carbon (theoretical 41.0%), 9.7% hydrogen (theoretical 9.4%), and 35.9% nitrogen (theoretical 35.9%). The product melts at 113° to 115° C. and is identified as dimethylaminoacetamidoxime.

There is the same result obtained by employing hydroxylamine sulfate in place of the hydroxylamine hydrochloride.

Example 2

There are added to a reaction vessel 24.5 parts of cyclohexylaminoacetonitrile and 50 parts of ethanol. There is then added gradually a solution of 12.6 parts of hydroxylamine hydrochloride in 100 parts of water. The reaction mixture is stirred for two hours and 100 parts of water is added. The reaction mixture is heated in order to dissolve the amidoxime hydrochloride and then 9.5 parts of sodium carbonate dissolved in 100 parts of water is introduced. There is then added 200 additional parts of water and the reaction mixture is cooled and filtered. The product is recrystallized from isopropyl alcohol. The product melts at 146° to 148° C. and is identified as cyclohexylaminoacetamidoxime. Some additional product is recovered by concentrating the filtrate.

In a similar manner, there is prepared cyclopentylaminoacetamidoxime from hydroxylamine hydrobromide and cyclopentylaminoacetonitrile.

*Example 3*

There are added to a reaction vessel 83 parts of t-octylaminoacetonitrile and 150 parts of ethanol. The mixture is cooled to 10° C. There is then added 35 parts of hydroxylamine hydrochloride dissolved in 150 parts of water. The exothermic heat of reaction carries the temperature to somewhat above room temperature and the reaction is held until no more heat is evolved. There is then added 35 parts of potassium carbonate dissolved in 100 parts of water. The ethanol is stripped off and the reaction mixture is chilled in order to crystallize the product. The product is recrystallized from a methanol-water solution yielding a compound that melts at 95° to 96° C. The product contains 59.5% carbon (theoretical 59.7%), 11.6% hydrogen (theoretical 11.4%), and 20.6% nitrogen (theoretical 20.9%). The product is identified as t-octylaminoacetamidoxime.

In like manner, there is prepared t-dodecylaminoacetamidoxime from t-dodecylaminoacetonitrile and hydroxylamine phosphate.

*Example 4*

There is introduced into a reaction vessel 17.7 parts of hydroxylamine hydrochloride dissolved in 150 parts of methanol. There is then added 13.5 parts of sodium methoxide dissolved in 100 parts of methanol. A solution of 51 parts of octadecylaminoacetonitrile dissolved in 250 parts of ethanol is then introduced. The reaction mixture is stirred overnight and then filtered. The mother liquor is concentrated by the use of vacuum and the crystallized product combined. Trituration with 300 parts of methanol and 200 parts of water, after filtration, yields the product. The product contains 11.8% nitrogen (theoretical 12.3%). The product melts at 97° to 98° C. and is identified as octadecylaminoacetamidoxime.

*Example 5*

Into a reaction vessel there is placed 28 parts of butylaminoacetonitrile dissolved in 50 parts of methanol. There is then introduced 17.5 parts of hydroxylamine hydrochloride dissolved in 50 parts of water, while the reaction medium is maintained at 35° C. The reaction mixture is allowed to stand overnight and then 13.2 parts of sodium carbonate dissolved in 100 parts of water is added. The reaction mixture is evaporated to dryness in vacuo and the product is extracted with ethyl acetate. The product is decolorized with charcoal and then allowed to crystallize. The product contains 28.6% nitrogen (theoretical 29.0%), melting at 85° C. and is identified as butylaminoacetamidoxime.

*Example 6*

There are added to a reaction vessel 31 parts of morpholinoacetonitrile and 50 parts of methanol. There is then added slowly 17.5 parts hydroxylamine hydrochloride in 50 parts of water. The reaction mixture is allowed to stand overnight and then 13.5 parts of sodium carbonate dissolved in 100 parts of water is added. The mixture is stripped to dryness in vacuo and the product is extracted with ethyl acetate. The product contains 45.4% carbon (theoretical 45.3%), 8.1% hydrogen (theoretical 8.2%) and 26.4% nitrogen (theoretical 26.4%). The product melts at 152° C. and is identified as morpholinoacetamidoxime.

*Example 7*

To a reaction vessel there is introduced a solution of 23.2 parts of hydroxylamine chloride dissolved in 75 parts of water. To this solution there is added slowly a solution of 39 parts of diethylaminoacetonitrile dissolved in 100 parts of methanol. An exothermic heat of reaction is observed and the reaction mixture is allowed to stand overnight at room temperature. There is then added 17.7 parts of sodium carbonate dissolved in water and the reaction mixture is evaporated in vacuo until crystals appear. The crystal form is isolated by cooling in ice water followed by filtration. The product is recrystallized from water to give a compound that melts at 80° C. The product contains 49.6% carbon (theoretical 49.6%), 10.5% hydrogen (theoretical 10.4%), and 29.2% nitrogen (theoretical 29.2%). The product is identified as diethylaminoacetamidoxime.

*Example 8*

There are added to a reaction vessel 33 parts of N-phenylglycinonitrile and 25 parts of methanol. There is then added a solution prepared by carefully adding 17.5 parts of hydroxylamine hydrochloride to 54 parts of 25% sodium methoxide in methanol. An exothermic heat of reaction is observed and the reaction mixture is allowed to stand overnight at room temperature. The salt formed is filtered off and the filtrate is evaporated to dryness. The residue is extracted with hot isopropanol. The alcohol solution is evaporated to dryness and the resulting crystals are recrystallized from ethyl acetate. The product contains 58.4% carbon (theoretical 58.1%), 6.8% hydrogen (theoretical 6.7%), and 25.3% nitrogen (theoretical 25.4%). The product has a melting point of 149° to 150° C. and is identified as anilinoacetamidoxime.

*Example 9*

There are added to a reaction vessel 28.6 parts of hydroxylamine hydrochloride dissolved in 200 parts of methanol. There is then slowly added 88 parts of a 25% sodium methoxide solution in methanol. To the reaction mixture, there is then slowly added 44 parts of N-phenyl - N - methylaminoacetonitrile. An exothermic heat of reaction is observed and sodium chloride is formed. The salt is removed by filtration and the filtrate is evaporated to a small volume. Water is added and then the reaction mixture is chilled to give an oil which later solidifies. The solid is recrystallized from ethyl acetate and dried in vacuo over phosphorus pentoxide. The product contains 60.3% carbon (theoretical 61.3%), 7.3% hydrogen (theoretical 7.3%) and 22.4% nitrogen (theoretical 23.4%). The product melts at 80° to 82° C. and is identified as N-methyl-N-phenylaminoacetamidoxime.

*Example 10*

There are added to a reaction vessel 45.5 parts of t-octylaminopropionitrile in 100 parts of water and 17.5 parts of hydroxylamine hydrochloride in 150 parts of methanol. There is then added 13.75 parts of sodium carbonate in 60 parts of water. The mixture is heated to reflux and then allowed to stand overnight. The reaction mixture is stripped in vacuo leaving an oil that slowly crystallizes. The crystallized product is recrystallized from ⅔ methanol-⅓ water giving a compound that melts at 103° to 104° C. The product contains 61.6% carbon (61.4% theoretical), 11.8% hydrogen (11.6% theoretical), and 19.8% nitrogen (19.5% theoretical) and is identified as t-octylaminopropionamidoxime.

In a similar manner there are prepared dodecylaminopropionamidoxime, cyclohexylaminopropionamidoxime, and morpholinopropionamidoxime.

We claim:

1. A composition of matter, the compound having the formula

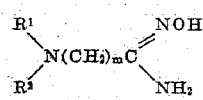

in which $R^1$ considered singularly is a member of the class consisting of a hydrogen atom and an alkyl group of 1 to 2 carbon atoms, $R^2$ considered singularly is a member of the class consisting of an alkyl group of 1 to 18 carbon atoms and a phenyl group such that when $R^1$ is alkyl, said $R^1$ and $R^2$ contain 1 to 2 carbon atoms each, $R^1$ and $R^2$ considered collectively represent a divalent saturated chain that forms with the amino nitrogen atom a 5 to 6 membered heteromonocyclicamine selected from the group consisting of pyrrolidinyl, piperidino, morpholino, and thiomorpholino, and $m$ is an integer of 1 to 2.

2. A composition of matter having the formula

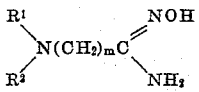

in which $R^1$ is an alkyl group of 1 to 2 carbon atoms, $R^2$ is an alkyl group of 1 to 2 carbon atoms and $m$ is an integer of 1 to 2.

3. A composition of matter having the formula

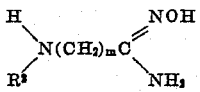

in which $R^2$ is an alkyl group of 1 to 18 carbon atoms and $m$ is an integer of 1 to 2.

4. A composition of matter having the formula

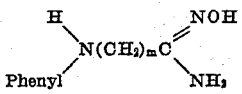

in which $m$ is an integer of 1 to 2.

5. A composition of matter having the formula

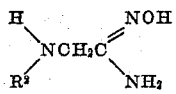

in which $R^2$ is an alkyl group of 1 to 18 carbon atoms.

6. A composition of matter having the formula

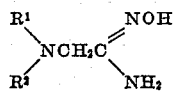

in which $R^1$ and $R^2$ are alkyl groups of 1 to 2 carbon atoms.

7. A composition of matter having the formula

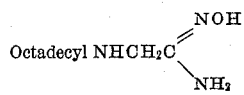

8. A composition of matter having the formula

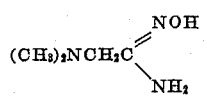

9. A composition of matter having the formula

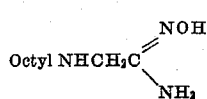

10. A composition of matter having the formula

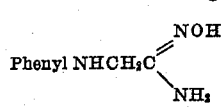

11. A composition of matter having the formula

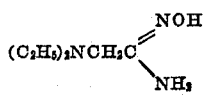

References Cited in the file of this patent
UNITED STATES PATENTS 2,676,968    Burtner    Apr. 27, 1954
2,851,457    Zimmermann    Sept. 9, 1958

OTHER REFERENCES

Migrdichian: The Chemistry of Organic Cyanogen Compounds, Reinhold Publishing Corporation, New York, pages 70–72 (1946).